United States Patent [19]

Brinkers

[11] 4,285,435
[45] Aug. 25, 1981

[54] HOLDER FOR PACKAGING, DISPLAYING AND OFFERING FOR SALE OF ARTICLES, AS WELL AS SEPARATE ASSEMBLY THEREFOR

[76] Inventor: Gerardus C. Brinkers, 49 Vlamingstraat, 2711 Ad Zoetermeer, Netherlands

[21] Appl. No.: 945,798

[22] Filed: Sep. 26, 1978

[30] Foreign Application Priority Data

Sep. 27, 1977 [NL] Netherlands .................. 7710543

[51] Int. Cl.³ .................. A47F 3/022; A47F 3/04
[52] U.S. Cl. .................. 211/49 D; 108/106; 108/136; 312/71; 312/306
[58] Field of Search .................. 108/2, 106, 37, 20, 108/136, 147; 312/71, 306, 312, 61, 36, 31.2, 31; 211/49 S, 49 D; 92/34, 37, 44; 248/157, 421

[56] References Cited

U.S. PATENT DOCUMENTS

| 2,021,233 | 11/1935 | Fink .................. 312/116 X |
| 2,373,029 | 4/1945 | Kiesling .................. 108/106 X |
| 2,546,361 | 3/1951 | Floyd .................. 248/421 X |
| 2,816,808 | 12/1957 | Haines .................. 312/71 |
| 3,033,633 | 5/1962 | Holloway et al. .................. 312/71 X |
| 3,104,141 | 9/1963 | Roulina .................. 312/306 |
| 3,202,061 | 8/1965 | Johnston .................. 92/44 X |
| 3,418,031 | 12/1968 | Fisher .................. 312/312 |
| 3,511,548 | 5/1970 | McIlhone .................. 708/136 X |
| 3,951,373 | 4/1976 | Swenson et al. .................. 248/157 X |
| 4,108,518 | 8/1978 | Angst .................. 312/71 X |

FOREIGN PATENT DOCUMENTS

494516 7/1953 Canada .................. 312/71

*Primary Examiner*—Roy D. Frazier
*Assistant Examiner*—Robert W. Gibson, Jr.
*Attorney, Agent, or Firm*—Ostrolenk, Faber, Gerb & Soffen

[57] ABSTRACT

A holder for packaging articles, displaying them and offering them for sale, comprising at least one pallet unit adapted for carrying, a number of articles or layers of articles separated by intermediate trays, the pallet unit having an upwardly and downwardly directed rim flange which may be discontinuous, a levelling device being present by means of which the pallet unit can be moved up and down, said holder further comprising means for the support or easy displacement of the filled holder.

7 Claims, 8 Drawing Figures

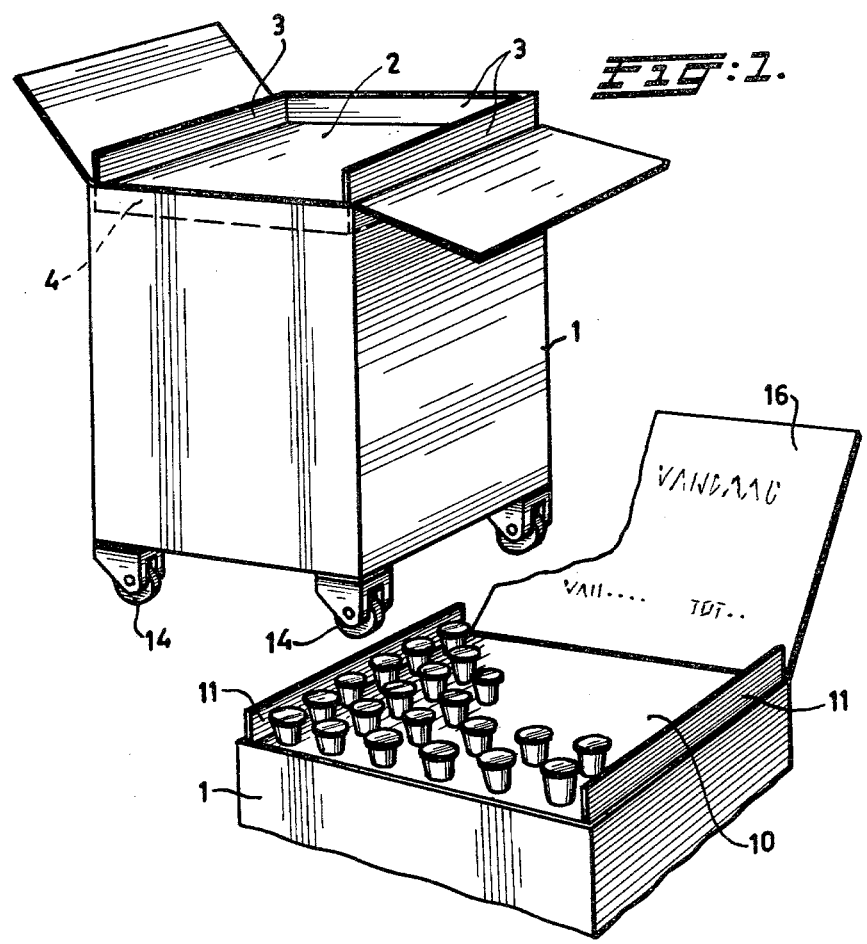
Fig. 1.
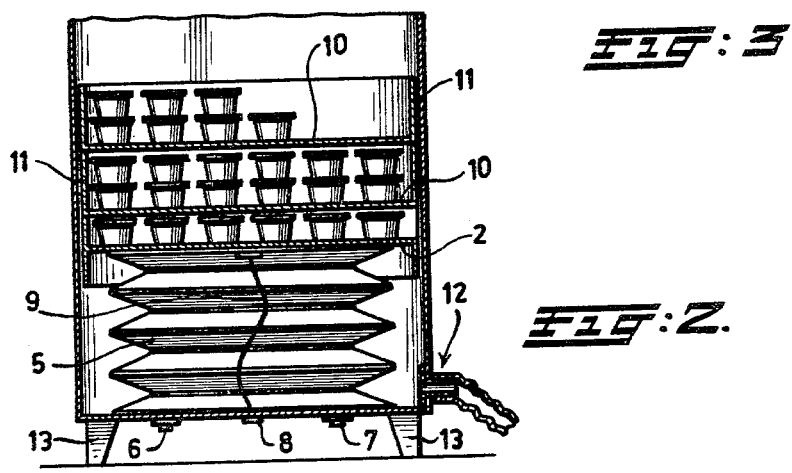
Fig. 2.
Fig. 3.

4,285,435

HOLDER FOR PACKAGING, DISPLAYING AND OFFERING FOR SALE OF ARTICLES, AS WELL AS SEPARATE ASSEMBLY THEREFOR

BACKGROUND OF THE INVENTION

The invention relates to a holder for packaging, displaying and offering for sale of articles at least one pallet unit being present adapted for carrying a number of articles or layers of articles separated by intermediate trays. Such a holder or package is known in different embodiments but only serves for the transport of the articles diments but only serves for the transport of the articles from the manufacturer to a shop, a supermarket or a retailer.

A disadvantage of such a holder or package is that on the place of sale, after having opened the holder at the upper side, the trays with the articles have to be taken out of the holder and the articles present thereon are to be placed on shelves.

A somewhat easier method would be to open the vertical front side and then remove either the articles or the trays with articles out of the holder.

SUMMARY OF THE INVENTION

The invention aims at providing a holder from which the trays need not to be removed so that the holder may be used at the same time for packaging, storing, transporting and displaying the articles in such a manner, that prospective buyers have an easy access to the articles.

In the holder according to the invention the pallet unit is provided with an upwardly and downwardly directed rim flange which may be discontinuous, a levelling device being present by means of which the pallet unit and the articles thereon are movable up and down; possibly together with trays with articles and supported by the pallet, the holder being provided with means for the support or the transport of the filled holder.

The flange serves for keeping the lowest pallet unit in a horizontal position on its moving up and down in the holder. The lowest pallet unit may thereby be provided on three sides with a rim flange and on the fourth side with half a flange on the underside. Since no flange is present on one side, the loading may be done from that side. A first layer of articles is pushed on to the horizontal pallet unit being in the highest position on the upper side of the package. The holder, which may be made of wood, metal or synthetic material, may then be so assembled that after in sequence bringing in the successive layers with articles, the upper side is closed and the package in filled condition is transported to the place of sale.

After opening the top side of the holder, the articles are offered for sale at a convenient level so tha the consumers (housewives) can inspect and size the articles easily. As soon as the upper layer is sold out, the pallet unit is raised in order to bring the next layer at the correct level. This renders it possible to have the articles always within reach of hand and vision of the potential buyers, who do not need to bend down to inspect the products. After emptying said holder, it may be used again. The holder may be made out of cardboard. In that case it will be destined for use only once. It represents a major improvement over the prior art in that much labour is saved at the retail shop as the consumer will be the first person ever touching the articles. This will also contribute in keeping the articles free from fingerprints or stains caused by repeatedly touching the articles.

In the case of easily damagable and fragile articles or their wrapping, it is of importance that each tray does not directly bear on the articles of a tray therebelow. The trays above the pallet unit are therefore provided with upright parts for mutual support, which parts may be attached by means of hinges. The height of said parts or supports depends upon the height of the articles on the trays.

For moving the pallet unit up an down possibly with the trays supported thereon, any suitable pneumatic, hydraulic, electric or mechanically acting means may be applied. An inflatable hollow body may be present for the up and down movement of the pallet unit and possible trays supported thereon, the inflatable body being provided with a valve and a pressure safety valve.

In another embodiment of the holder according to the invention the means for moving up and down of the pallet unit and if necessary with trays placed thereon may consist of a screw spindle or a so-called lazy tong mechanism which may be operated from outside the holder.

The invention is also embodied in a loose assembly or element comprising a pallet unit and a device for moving the pallet unit up and down, said element being suitable for a holder as hereabove described. Said loose assembly may be applied as an independent element and then being surrounded by a housing enclosing same.

An important advantage of the invention consists of the environment friendly aspect of the holder. Said holder makes it indeed possible to omit the many changing of boxes (detailist package) necessary up to now.

SURVEY OF THE DRAWINGS

FIG. 1 shows a view of the holder according to the invention with opened upper side;

FIG. 2 is a cross section over a portion of the holder with tubular connections for the supply of conditioned air;

Figure 4:
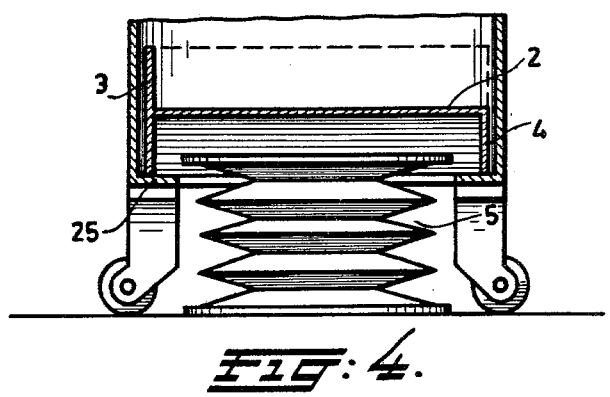

FIG. 3 gives a partial view of the upper side of the holder in the position of the articles offered for sale with the pallet unit half way the holder;

FIG. 4 is a view of a loose assembly or element, comprising a pallet unit with a inflatable hollow body positioned upon the floor.

Figure 5:
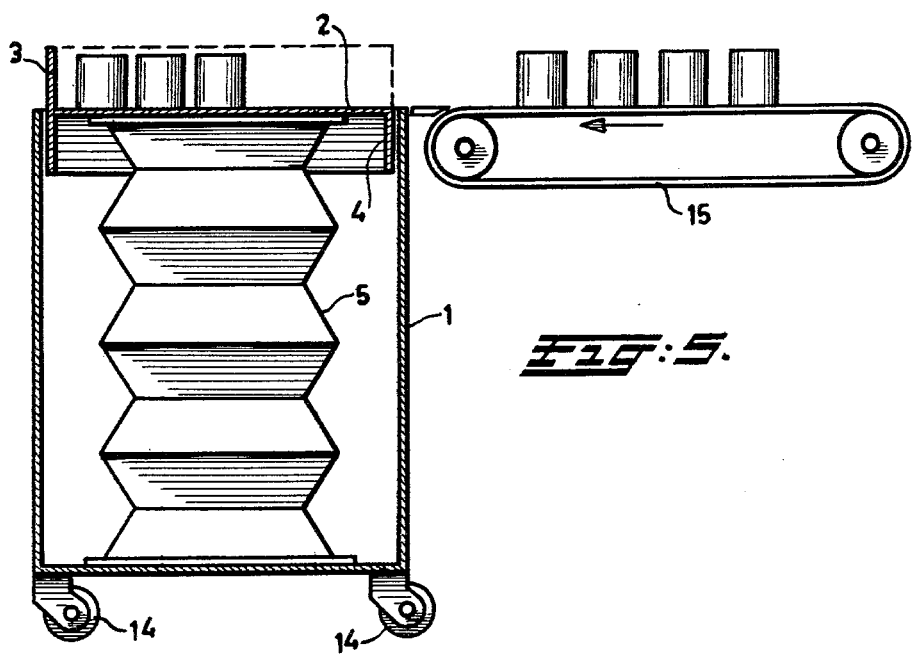
Figure 6:
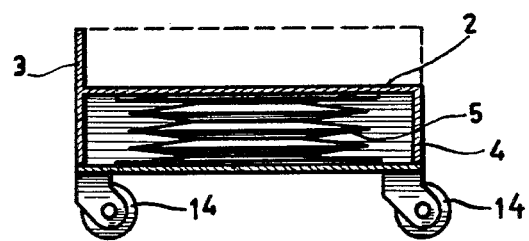

FIG. 5 shows a holder of which the front flange has been taken off and an endless belt is present next to the holder for loading articles on the pallet unit;

FIG. 6 is a longitudinal section of the lower end of the holder with the inflatable hollow body being at its lowest position.

Figure 7:
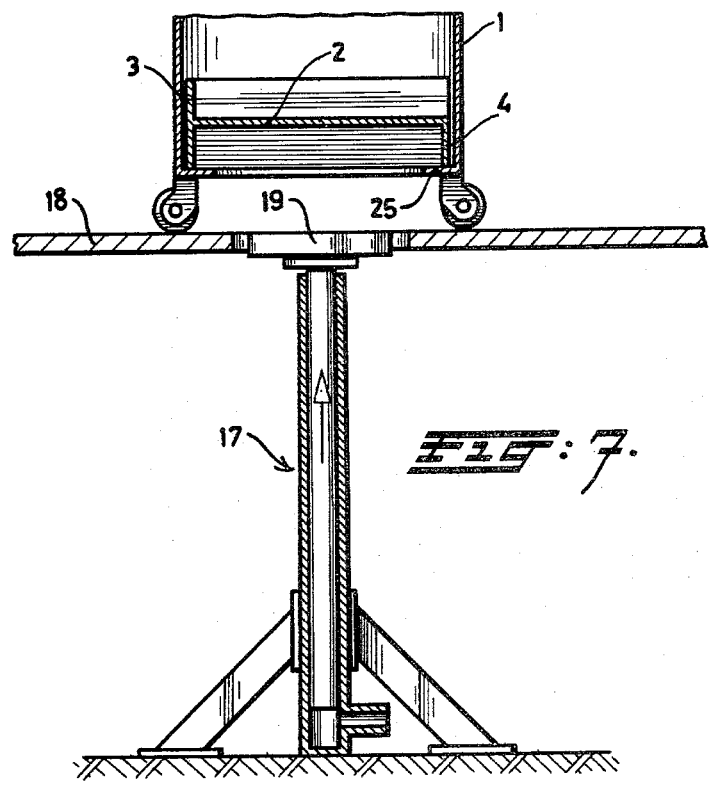

FIG. 7 shows an embodiment according to FIG. 4, in which the pallet unit is raised by a hydraulic levelling mechanism mounted within the floor.

Figure 8:
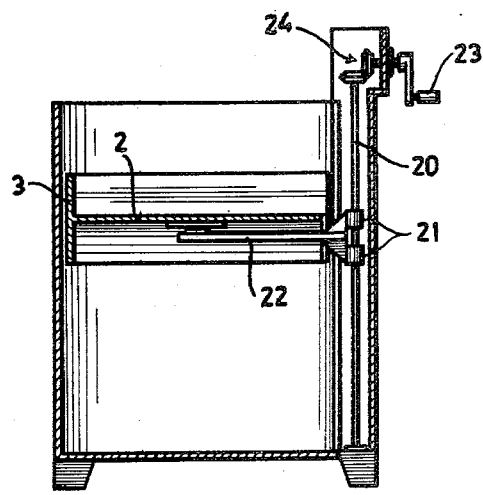

FIG. 8 is a longitudinal section of a holder comprising a hollow wall in which a screw spindle is mounted acting as a levelling mechanism.

DESCRIPTION OF THE PREFERRED EMBODIMENTS

In the drawings a holder is indicated with numeral 1, which may be manufactured of cardboard in the form of corrugaged cardboard, however, also of any other material and of which the upper side is opened. A pallet 2 which has been brought to the upper rim of the holder in a manner to be described hereinafter is provided with flanges 3 on three sides. A fourth flange is indicated in FIG. 1 with the reference numeral 4. In the position indicated in FIG. 1 a tray with articles may be pushed from the front side of the holder or on the pallet 2 by means of a conveying belt or lifting device.

Under the pallet 2 a levelling or adjustable support device is present by means of which the pallet 2 is brought into the position indicated. In the presented embodiment of the holder according to the invention said device for moving the pallet 2 up and down comprises an accordion bellows 5 (see FIG. 2) provided with a valve 6 which may be connected to a hand pump, to a source for compressed air or a foot pump for inflating the bellows 5 and thereby causing a rising of the pallet 2. The valve 6 may also serve as a pressure relief valve in case air has to be removed from the bellows for lowering the pallet 2. A pressure safety valve 7 is also connected to the bellows 5 which valve may be so adjusted that the pressure in the bellows 5 may not exeed a previously determined maximum.

Furthermore there is a valve 8 connected to a wire 9, with the underside of the pallet 2. As soon as the pallet 2 has arrived in the described manner on the upper side of the holder as shown in FIG. 1 the wire 9 is stretched and on further extension of the bellows 5 the valve 8 is opened for relieving the pressure in the bellows 5.

After placing a tray with articles on the pallet 2 the pressure in the bellows is lowered which may be done by means of the valve 6 so that the pallet 2 goes downwards and a successive tray of articles may be placed on the firstly provided tray. Only a few of the trays with articles indicated in FIG. 2. with the reference numerals 10 are shown in said figure.

The trays 10 are at the upper side provided with supports 11 for preventing that the trays placed above each other do not lean on the articles of a tray below said tray. This is of course of importance in case the articles are fragile or packed in easily deformable or fragile packages such as paper beakers or thin synthetic packages. It is also possible to use trays without supporting pieces in case there is no danger of damaging articles or the packages thereof. One may also in case of trays without supports if desired go over to the use of separate bridging pieces, a loose bridging piece being then placed in each tray to protect the articles placed thereon.

In FIG. 2 a connection 12 is indicated for a tube for connecting to a source of compressed air, which air is used for flowing around the articles, for example for cooling.

FIG. 3 shows the position wherein the holder according to the invention is in a position exhibiting the articles offered for sale on a tray 10. The holder 1 is in said embodiment provided with a cover 16 with a multiple purpose. On the inner side of said cover a special sales offer may be announced thereon, said cover forming together with the supports 11 a surrounding for the products. After the sale of said articles the tray is removed and the bellows 5 so inflated that a successive tray 10 comes at the place of the removed tray. After the lowest tray 10 has finally served for exhibiting of the articles and said tray has become empty all trays if necessary with the separate bridging pieces may be placed inside the holder after the air from the bellows 5 is released. The holder may then be used again for packaging etc.

For increasing the suitability and easy handling of the holder 1 same is provided under the bottom with four small legs 13 (see FIG. 2) or preferably as shown in FIG. 5 with castor wheels 14.

In FIG. 4 a loose assembly or element is shown, comprising a pallet unit 2 and the device for moving the pallet unit up and down which device consists of an accordion bellows 5. The pallet is provided with flanges 3 and 4. Said loose unit may be used as a self-contained element and be placed in or under a holder. Said unit may be surrounded by a preformed or foldable envelope encompassing the unit on all sides.

The envelope may also removably surround the unit on four sides, so that both elements may be returned for renewed use separately from each other with the smallest possible volume. After assembling the holder may be used again. On offering the articles for sale in a shop, a tray with articles extends somewhat above the envelope for exhibiting the articles and allowing an easy access for the hand of the consumer (vide FIG. 3).

FIG. 5 gives a view of the holder of which the front flange 3 is removed. Next to the holder 1 a conveying belt 15 is present for supplying the articles to be packaged on the pallet unit 2 at the side where there is only a downward flange 4. After the articles are placed on the pallet unit 2 the pallet unit is allowed to descend and a tray with articles placed thereon may be stacked on the pallet unit etc.

FIG. 6 shows a longitudinal section of the lower side of the holder provided with legs or castor rolls, the inflatable hollow body 5 being at its lowest position.

FIG. 7 shows a variant of FIG. 4 in that the bellow 5 is substituted by a hydraulic plunger 17 mounted in the floor 18. The platform 19 of the plunger will raise and lower the pallet unit 2. The lower edge of the flanges 3 and 4 will rest upon a frame or a ledge 25.

FIG. 8 is an embodiment using a screw spindle 20 with a double nut 21 for carrying an arm 22 supporting the pallet unit 2. The spindle 20 is connected to a handle 23 through a conical gearing 24.

What is claimed is:

1. A holder for packaging articles, displaying them and offering them for sale, at least one pallet unit being present in the holder adapted for carrying a number of articles or layers of articles separated by intermediate trays, the pallet unit being provided along at least a substantial portion of its periphery with an upwardly and downwardly directed rim flange, a levelling device being present by means of which the pallet unit and the articles thereon are movable up and down, together with article bearing trays which may be supported by the pallet unit, the holder comprising means for the support and convenient positioning of the filled holder said levelling device being selectively operable to move said pallet unit to a selected level and maintain said pallet unit at said selected level until operation of said levelling means by an operator to move said pallet unit to another selected level, said levelling device for moving the pallet unit up and down together with any trays which may be supported on said pallet comprising an inflatable hollow body below the pallet unit provided with a valve and a pressure safety valve.

2. The holder of claim 1, wherein there is a stack of article bearing trays above the pallet unit and supported thereby, said trays being provided with separator means engaging adjacent trays to prevent articles on said trays from being damaged by trays thereabove.

3. A holder as defined in claim 1, wherein there is also a pressure release valve operatable from outside the holder.

4. The holder of claim 1, wherein a wall of the holder is provided with a connection for a tube for the supply of conditioning air.

5. The holder of claim 1 in which the upwardly directed rim flange of the pallet is provided with a side opening through which articles are loaded onto said pallet while the latter is positioned at the top of said holder by the levelling device.

6. The holder of claim 1 including a hinged top cover openable to display articles within said holder.

7. A holder for packaging articles, displaying them and offering them for sale, at least one pallet unit being present in the holder adapted for carrying a number of articles or layers of articles separated by intermediate trays, the pallet unit being provided along at least a substantial portion of its periphery with an upwardly and downwardly directed rim flange, a levelling device being present by means of which the pallet unit and the articles thereon are movable up and down, together with article bearing trays which may be supported by the pallet unit, the holder comprising means for the support and convenient positioning of the filled holder, said levelling device being selectively operable to move said pallet unit to a selected level and maintain said pallet unit at said selected level until operation of said levelling means by an operator to move said pallet unit to another selected level, said levelling device for moving the pallet unit up and down together with any trays which may be supported on said pallet comprising an inflatable hollow body below the pallet unit provided with a valve and a pressure safety valve, said levelling device being disposed generally outside of said holder and including a vertical plunger extendable into said holder through a bottom opening therein to support and lift the pallet unit.

* * * * *